C. S. HAMILTON.
Grain Distributer.
No. 2,178. Reissued Feb. 20, 1866.
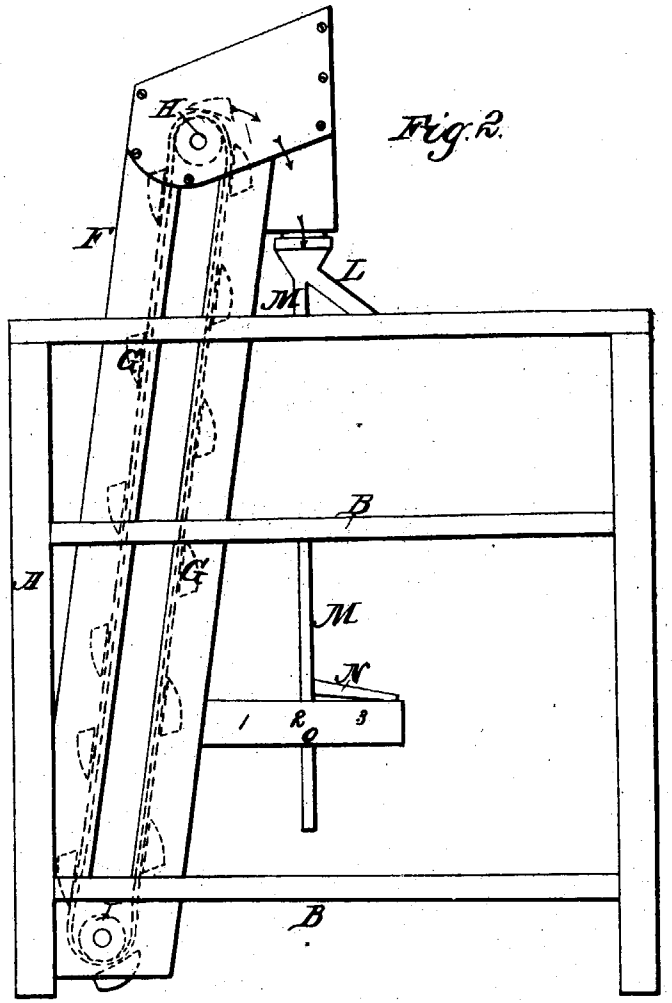
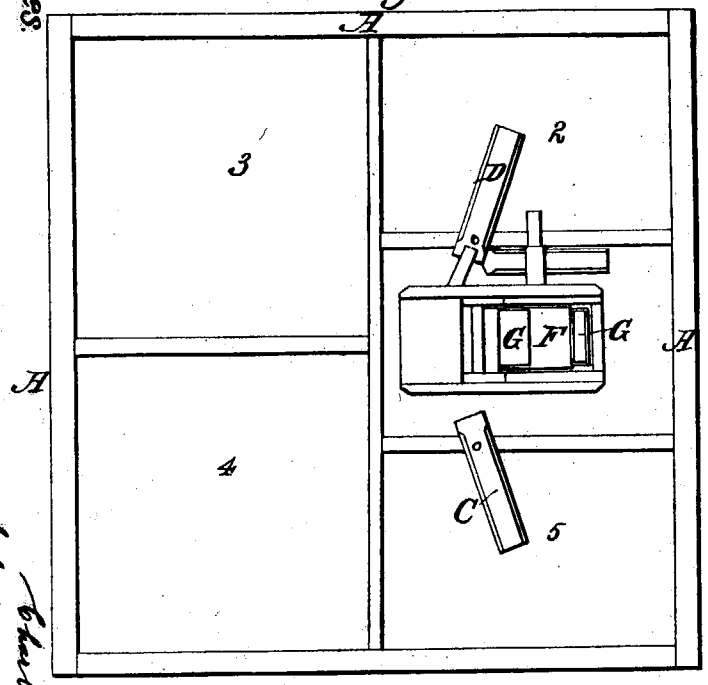
Witnesses.
E. Reed
G. M. Alexander
Inventor.
Charles S. Hamilton
by his Attorney Daniel Reed.
N. PETERS, Photo-Lithographer, Washington, D. C.

UNITED STATES PATENT OFFICE.

CHARLES S. HAMILTON, OF FOND DU LAC, WISCONSIN.

IMPROVEMENT IN DISTRIBUTING GRAIN TO DIFFERENT BINS.

Specification forming part of Letters Patent No. 43,200, dated June 21, 1864; Reissue No. 2,178, dated February 20, 1866.

*To all whom it may concern:*

Be it known that I, CHARLES S. HAMILTON, of Fond du Lac, in the county of Fond du Lac and State of Wisconsin, have invented a new and useful Improvement in Grain Elevators and Distributers; and I do hereby declare that the following is a clear, full, and exact description thereof, reference being had to the accompanying drawings, making part of this specification, and to the letters of reference marked thereon.

Figure 1 is a plan view of one form of my invention applied in a mill or warehouse, and Fig. 2 is a side elevation of the same.

The nature of my invention consists in constructing and combining with a grain-elevator devices or mechanism by which the grain may be directed at will into any of the bins or receptacles arranged to receive it by the attendant, who may be in a different part of the building from the delivery-spout, and without his being obliged to go to the spout and move it by hand.

It also consists in combining with said devices or mechanism an index so arranged as to indicate the bin into which the grain is being delivered, and thus serve as a guide for operating the device.

To enable othes skilled in the art to construct and use my invention, I will proceed to describe it.

In mills and warehouses for storing grain it is customary to elevate the grain to the upper stories by means of the well-known endless-belt and bucket elevator, and there distribute it into bins, arranged in various parts of the room, by means of a revolving spout, which is turned, as occasion may require, by a person going to it and moving it by hand, so as to cause it to deliver the grain into any one of a series of spouts leading to the different bins. This plan necessitates going up into the upper portion of the building where the spout is located, thus creating a great amount of unnecessary labor. It is also obvious that when the attendant is in any other part of the building where he cannot see the spout there is no means of knowing into which of the bins the grain is being delivered. For the purpose of obviating these difficulties, I combine with the revolving spout means for operating it from below and an index for indicating which of the bins the grain is being delivered into, and also to guide the attendant in changing the spout so as to deliver the grain into any desired bin.

In the drawings, A represents the walls of a building, and B the floors. In this building is placed the ordinary elevator F representing the belt, and G the buckets, passing around the pulleys H and I. Underneath the delivery-spout of this elevator in the upper story I locate a revolving spout, L, provided with a funnel-shaped hopper to receive the grain as it falls from the buckets G of the elevator, and to this spout L, I attach a shaft, M, which extends downward to the floor or room where the attendant is to be located, as shown in Fig. 2, so that by taking hold of s id shaft M the attendant may at any time turn the spout L in the upper part of the building around as he pleases.

In Fig. 1 the room is represented as being devided into bins, (designated by the numerals 1, 2, 3, 4, and 5.) In this case the elevator and revolving spout L are represented as occupying a central position within the bin 1, and the spout L of such a length that it will, when properly turned, discharge the grain direct into bins 3 and 4. In the case of bins so located that the spout L cannot reach them, it discharges its grain into fixed spouts leading thereto, as represented by C and D, the latter leading to bin 2 and the former to bin 5, the spout being represented in these different positions by the dotted lines in Fig. 1. It is obvious that any number of bins may be thus arranged, and that by means of spouts suitably arranged the grain may be made to flow into bins on either of the lower floors, in case there are bins upon the different floors; or, if preferred, a separate elevator and revolving spout may be provided for each separate floor. It is only in mills, as a general thing, that bins are arranged upon separate floors, those of the large grain-warehouses usually extending from top to bottom of the building through all the stories.

In order to indicate how far or to what exact position the shaft M must be turned to move the spout L so as to cause it to discharge its grain into any particular bin, I arrange in the room where the attendant remains an index or dial having marked on it numbers or characters to correspond with the different bins, the dial in this case being represented by a circle or ring, O, arranged concentric with the shaft M. I then attach to the shaft M a pointer or index, N, which, as the shaft is turned, shall point to the number on the circle O that indicates the bin into which the grain will be delivered by the spout L above. In ordinary mills and in small warehouses, where the apparatus will be light and easily moved, the pointer N will serve as a handle for moving the shaft and spout; but where a larger and heavier apparatus is required, as in the large grain-warehouses, a lever may be provided for the special purpose, or gearing may be used, or any of the known mechanical devices may be applied for operating it.

The plan here shown represents the simplest or elementary form of applying my invention. It is, however, obvious that this plan may be modified to any desired extent without departing from the spirit and intent of my invention. If, for instance, from any cause it is not desired or is not convenient to extend the shaft directly from the spout above to the room below, the index and devices used for operating or turning the spout may be located in any other part of the building by using bevel-gear and shafts, or belts and pulleys, properly arranged for that purpose, these of course being varied to suit the circumstances of each individual case, and requiring only the skill of the ordinary mechanic. This variation will be the more especially required in applying my invention to grist-mills and other buildings already erected, as in many of these the location of the grinding-stones or other apparatus may be such that it is not possible, or at least is inconvenient, to extend the shaft down, as here shown. In other cases the person having charge may desire or be compelled to locate his office or room in one corner of the building, or even outside of the main building, or upon some other floor, in any of which cases the index or dial and means for operating the spout L may be thus located, and the operation carried on as perfectly as though arranged in the simple form here shown.

In conclusion, I desire to be distinctly understood as not confining myself to the special devices or means here shown for applying my invention, as it is obvious that the manner of applying it may be indefinitely modified to suit circumstances.

Having thus fully described my invention and shown one method of applying it, what I claim is—

1. The combination, with a revolving spout for delivering grain or similar material to different bins, of the shaft M or any equivalent device, to enable the attendant to move or adjust said spout, substantially as and for the purpose set forth.

2. The combination, with a revolving spout, of an indicator arranged to show the position of said spout, and to enable the attendant to properly adjust the same, substantially as and for the purposes set forth.

C. S. HAMILTON.

Witnesses:
C. K. PIER,
WM. D. CONKLIN.